(12) United States Patent
Monti

(10) Patent No.: US 10,647,558 B2
(45) Date of Patent: May 12, 2020

(54) STABILISING DEVICE FOR STABILISING ARTICLES DURING RAISING AND GROUPING OF THE ARTICLES

(71) Applicant: MARCHESINI GROUP S.P.A, Pianoro (IT)

(72) Inventor: Giuseppe Monti, Pianoro (IT)

(73) Assignee: MARCHESINI GROUP S.P.A., Pianoro (Bologna) (IT)

( * ) Notice: Subject to any disclaimer, the term of this patent is extended or adjusted under 35 U.S.C. 154(b) by 0 days.

(21) Appl. No.: 16/099,013

(22) PCT Filed: May 4, 2017

(86) PCT No.: PCT/IB2017/052613
§ 371 (c)(1),
(2) Date: Nov. 5, 2018

(87) PCT Pub. No.: WO2017/195077
PCT Pub. Date: Nov. 16, 2017

(65) Prior Publication Data
US 2019/0135468 A1    May 9, 2019

(30) Foreign Application Priority Data
May 12, 2016   (IT) .......................... 102016000048580

(51) Int. Cl.
*B66F 9/18*     (2006.01)
*B65B 35/52*    (2006.01)
*B65G 57/02*    (2006.01)

(52) U.S. Cl.
CPC ................ *B66F 9/18* (2013.01); *B65B 35/52* (2013.01); *B65G 57/02* (2013.01)

(58) Field of Classification Search
CPC ......... B66F 9/18; B25B 5/145; A47K 10/423; A47K 10/425; B65G 57/02; B65G 57/302;
(Continued)

(56) References Cited

U.S. PATENT DOCUMENTS 1,024,721 A  *  4/1912  Davis .................... B30B 9/3053
                                                                100/219
3,092,266 A       6/1963  Dekoning
(Continued)

FOREIGN PATENT DOCUMENTS

GB           384606 A    12/1932

*Primary Examiner* — Gregory W Adams
(74) *Attorney, Agent, or Firm* — R. Neil Sudol; Henry D. Coleman

(57) ABSTRACT

Device for stabilising articles has a bar abuttable by the articles during raising upwards thereof in grouping operations. A support element of the abutting bar is predisposed so as to be coupled to vertical sliding guides so as to be freely slidable along the guides and enable displacement upwards of the abutting bar pushed by the articles when raised upwards during the grouping operations. The stabilising device further comprises a contact element, predisposed on the support element so as to be translatable with respect to the support element, and an activator of the contact element, activatable for moving the contact element from a non-operative position, at which the contact element is distant from the vertical sliding guides, to an operative position, at which the contact element is in contact with at least one of the vertical sliding guides.

5 Claims, 4 Drawing Sheets

(58) Field of Classification Search
CPC .... B65G 59/02; B65B 35/52; B65H 45/1015; B65H 2301/42242; B65H 2301/42162; B65H 31/3045; Y10T 16/90; B66B 7/04; B66B 7/047; B66B 1/32; B66B 1/26; B66B 1/28; B66B 5/18

See application file for complete search history.

(56) References Cited

U.S. PATENT DOCUMENTS

| | | | | |
|---|---|---|---|---|
| 4,235,061 | A * | 11/1980 | Watanabe | G07D 9/06 209/602 |
| 4,488,845 | A * | 12/1984 | Dupre | B42C 9/0043 100/219 |
| 6,830,132 | B1 * | 12/2004 | Kang | B66B 9/022 187/271 |
| 7,213,684 | B2 * | 5/2007 | Bruns | B66F 9/18 187/237 |
| 7,393,171 | B2 * | 7/2008 | Fu | B42C 11/04 100/38 |
| 7,621,520 | B2 * | 11/2009 | Liatard | B41J 3/50 235/449 |
| 7,766,318 | B2 * | 8/2010 | Krause | B65H 3/045 271/11 |
| 2002/0112455 | A1 | 8/2002 | Sugahara et al. | |
| 2014/0332324 | A1 * | 11/2014 | Husmann | B66B 5/20 187/359 |

* cited by examiner

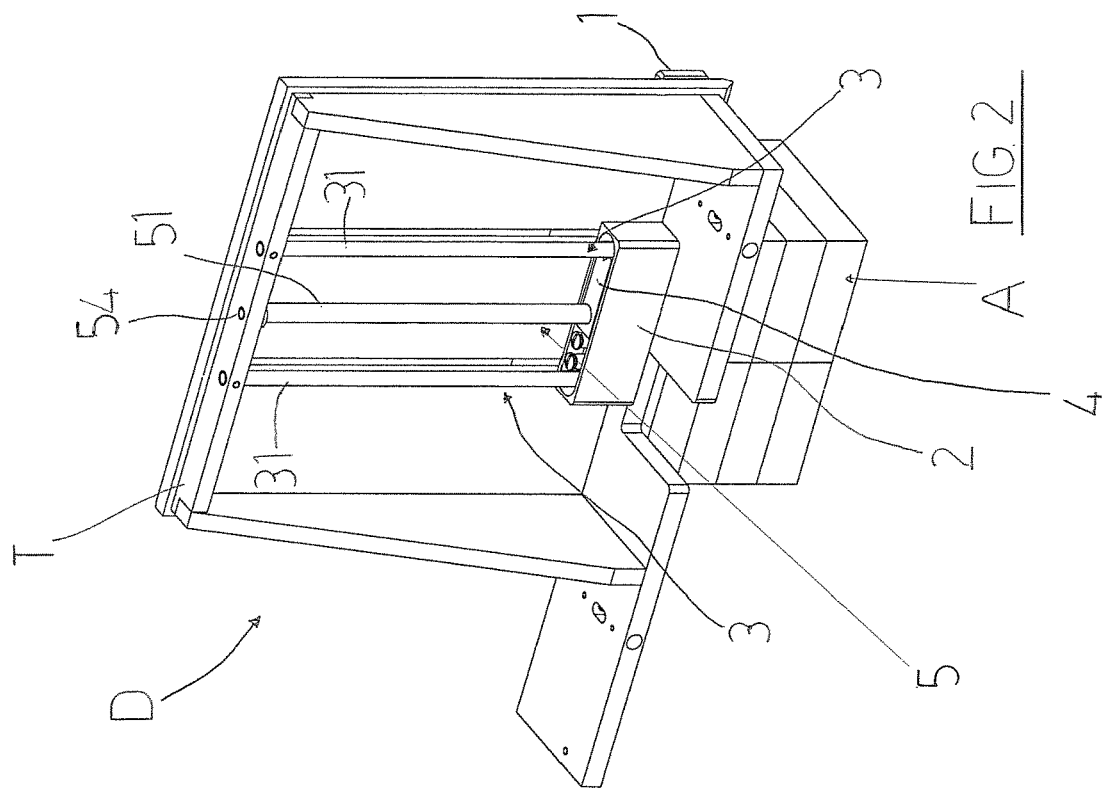
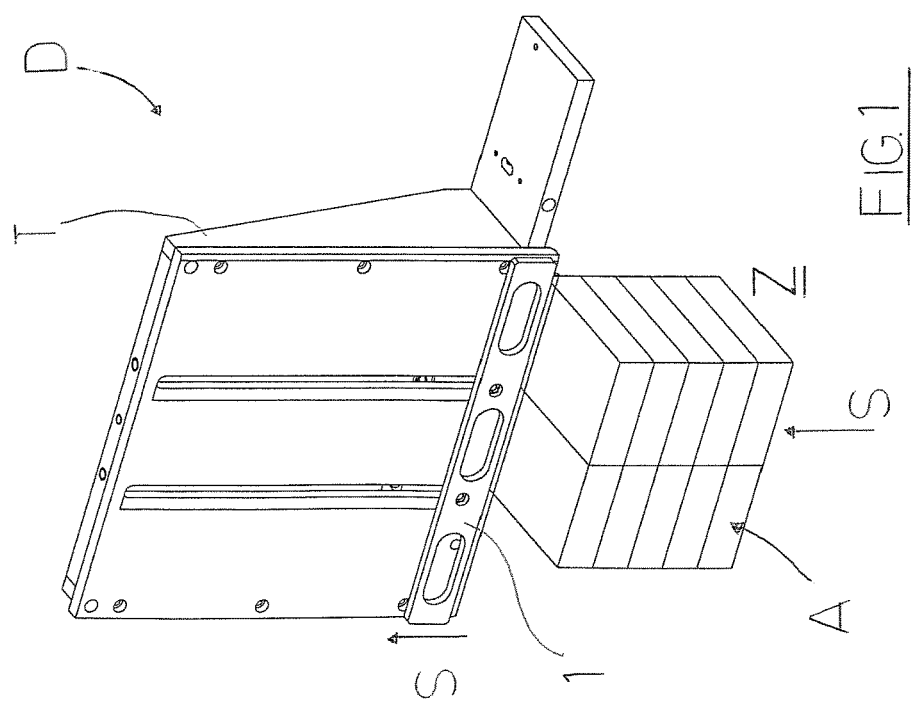

STABILISING DEVICE FOR STABILISING ARTICLES DURING RAISING AND GROUPING OF THE ARTICLES

FIELD OF THE INVENTION

The present invention relates to the technical sector of automatic machines for packaging articles, such as for example boxes containing pharmaceutical or cosmetic products, and in particular automatic machines which include carrying out a grouping of one or more rows of articles in one or more layers superposed on one another, before packaging the grouping thus-obtained internally of an enveloping film or inside a box.

DESCRIPTION OF THE PRIOR ART

In this regard, the automatic machines comprise a grouping zone to which the articles to be grouped are fed in sequence, one following another, the articles reaching the grouping zone being time-by-time raised, up to forming a grouping with a desired number of layers of articles.

In this particular ambit, the present invention relates to a stabilising device for stabilising articles during raising and grouping of the articles.

In order to carry out the raising and grouping operations of the articles in various superposed layers, a pusher member is included which pushes and raises the articles reaching the grouping zone upwards, and position maintaining elements activatable for supporting the raised articles in preparation for the pusher member to push the following articles and raise them upwards.

The pusher member for raising the articles upwards is usually activated rapidly and with high frequency, and consequently the articles which time-by-time reach the grouping zone are pushed upwards with a considerable acceleration, going to abut against the layers of the previously-raised articles, and at the same time maintained raised by the position maintaining elements.

It follows that the articles of the various already-raised layers are subjected, time by time, to a counterblow that causes the articles of the upper layer to jump upwards: this without doubt constitutes a drawback as the articles of the grouping under formation can become dis-united and lose their reciprocal position, thus disturbing the grouping.

At present, in order to obviate the above drawback, a stabilising device of the grouping of the articles is used during the raising thereof, which stabilising device comprises an abutting bar mounted on a carriage which is freely slidable on vertical guides; the abutting bar is therefore usually in a lowered position relative to the vertical guides.

The stabilising device is positioned at the grouping zone in such a way that the abutting bar, in the lowered position thereof, is in the zone in which the articles are time-by-time pushed and raised upwards by the pusher member.

The abutting bar is then abutted by the first layer of articles which is pushed upwards by the pusher member and is therefore also pushed upwards due to the sliding of the carriage along the relative vertical guides.

Each time the pusher member pushes and raises a layer of articles upwards to bring them into abutment against the previously-raised articles, thus raising the various formed layers upwards to make room for the following articles in arrival in the grouping zone, the abutting bar is also pushed upwards.

The function of a stabilising device such as the one described would therefore be to be prevent, owing to the presence of the abutting bar in contact with the upper layer of the articles of the grouping under formation, the counterblow suffered by the articles of the grouping from causing the articles of the upper layer to jump.

In practice, however, a stabilising device such as the one described has not been demonstrated to be entirely effective as the upwards thrust exerted by the pusher member for raising the articles time-by-time and placing them in abutment against the layers previously formed generates counterblows of an entity that is such as to cause the abutting bar too to jump upwards, as well as the articles of the upper layer.

The occurrence of this circumstance without doubt generates drawbacks, as the abutting bar falls, time by time, on the articles under grouping formation, and can be the cause of damage to the articles or contribute to a de-alignment among them and therefore to a disruption of the grouping.

Further, when the group of articles, once completed, is transferred downstream towards the packaging station, the abutting bar, no longer supported by the group, falls by force of gravity downwards, as the carriage bearing the abutting bar is freely slidable along the vertical guides, and bumps against the articles which in the meantime have reached the grouping zone.

SUMMARY OF THE INVENTION

The aim of the present invention is therefore to provide a novel stabilising device for stabilising articles during raising and grouping thereof that is able to obviate the above-cited drawbacks in the devices of known type.

In particular, an aim of the present invention is to provide a novel stabilising device configured so as to maintain the abutting bar always in contact with the upper layer of the articles of the group under formation, and therefore able to prevent the counterblows suffered by the layers of articles of the group of articles under formation from determining a raising and detachment of the abutting bar from the upper layer of the articles of the group.

The above-cited aims are obtained by a stabilising device according to claim 1.

Further advantageous characteristics of the stabilising device of the invention are set down in the various dependent claims.

BRIEF DESCRIPTION OF THE DRAWINGS

The characteristics of a preferred, but not exclusive, embodiment of the stabilising device for stabilising articles during raising and grouping thereof, of the present invention will be described in the following with reference to the appended tables of drawings, in which:

FIG. 1 illustrates, in a front perspective view, the stabilising device of the invention for stabilising articles during raising and grouping of the articles; the figure schematically illustrates a grouping of articles under formation, constituted by two articles flanked to one another for each layer; this figure omits the elements used for forming and raising the grouping of articles as this is not pertinent for the present invention;

FIG. 2 illustrates the stabilising device of the invention of FIG. 1 in a rear perspective view;

DESCRIPTION OF THE PREFERRED EMBODIMENTS

Figure 4:
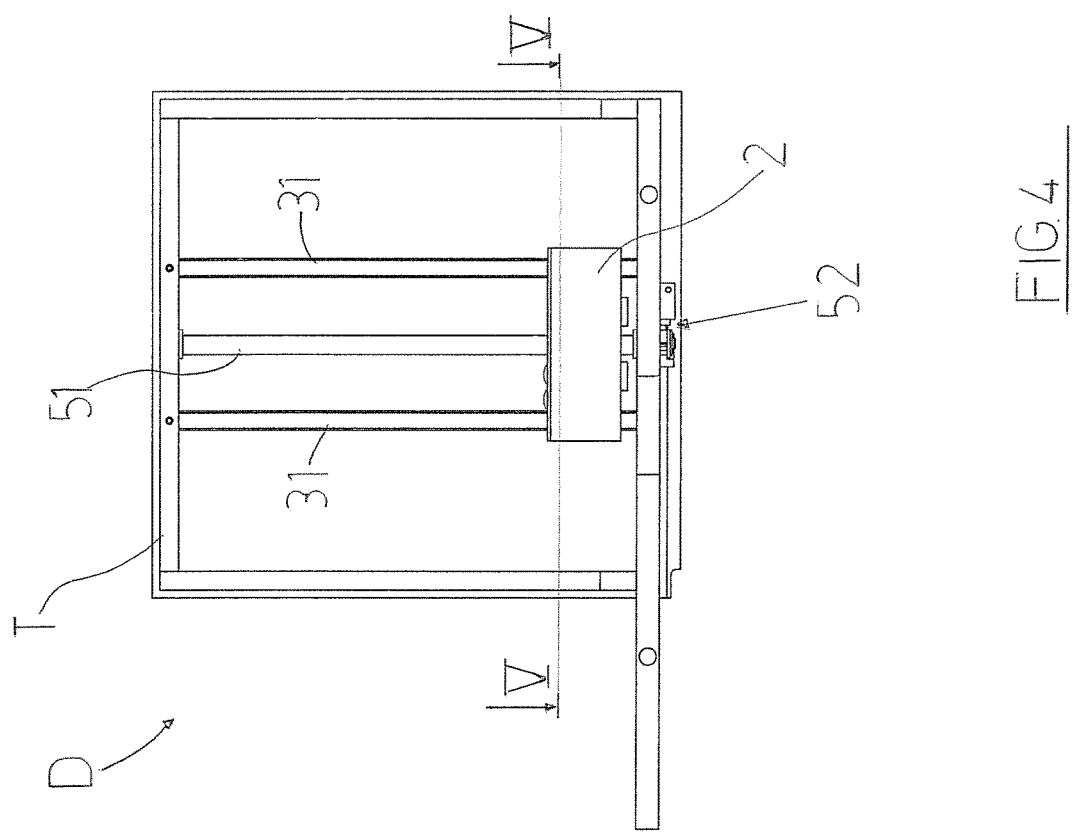
FIG. 4 illustrates the stabilising device of the invention of FIG. 1 in a front posterior view.

With reference to the appended tables of drawings, reference letter (D) denotes the stabilising device for stabilising articles (A) during raising and grouping thereof, object of the invention, in its entirety.

As illustrated in the foregoing, the stabilising device (D) is used in all those cases in which it is necessary to carry out a grouping of articles, superposed on one another in a series of layers of articles, before the grouping is packed internally of a relative enveloping film and/or in a relative box.

In the case illustrated in the figures, the articles are constituted by boxes containing internally thereof products of a cosmetic or pharmaceutical type, but special mention is made of the fact that the stabilising device (D) of the invention can also be used for any other type of article.

For example FIG. 1 illustrates a grouping of articles (A) under formation.

The articles (A) which are to be grouped are conveyed in succession towards a grouping zone (Z) at which the articles (A) are pushed time by time upwards (arrow (S) in FIG. 1), forming a grouping of articles, i.e. a sort of stacking of articles formed by a series of superposed layers.

In the example of FIG. 1 the grouping of articles which is being formed is constituted by a series of superposed layers of articles, each layer comprising two articles flanked to one another.

To carry out this raising and grouping operation, as mentioned in the foregoing, a pusher member (not illustrated as of known type and not pertinent to the invention) is used, activatable time-by-time for raising the articles which are fed into the grouping zone and pushing them upwards in abutment against the articles previously raised, and then raising the grouping under formation further upwards, so as to free the space for the arrival of successive articles to be regrouped in the same grouping or in a following grouping.

Also present are position maintaining elements (also not illustrated) which are activated for maintaining the grouping of articles raised during formation.

The stabilising device (D) of the invention comprises, as can for example be seen in FIG. 1, an abutting bar (1), configured and predisposed for being abutted by the articles (A) which are raised upwards during operations for grouping thereof; a support element (2) of the abutting bar (1); and vertical sliding guides (3) (visible for example in FIG. 2).

The support element (2) is predisposed so as to be coupled to the vertical sliding guides (3) and in order to be able to freely slide along the vertical sliding guides (3) so as to enable displacement upwards of the abutting bar (1) when it is pushed by the articles (A) which are raised upwards during the operations for grouping thereof (by the pusher member), during the operations for the grouping thereof (see arrows (S) in FIG. 1).

The peculiar characteristics of the stabilising device (D) of the present invention consist in the fact that it comprises: a contact element (4), predisposed on the support element (2) so as to be translatable with respect to the support element (2), and activating means (5) of the contact element (4).

Figure 5A:
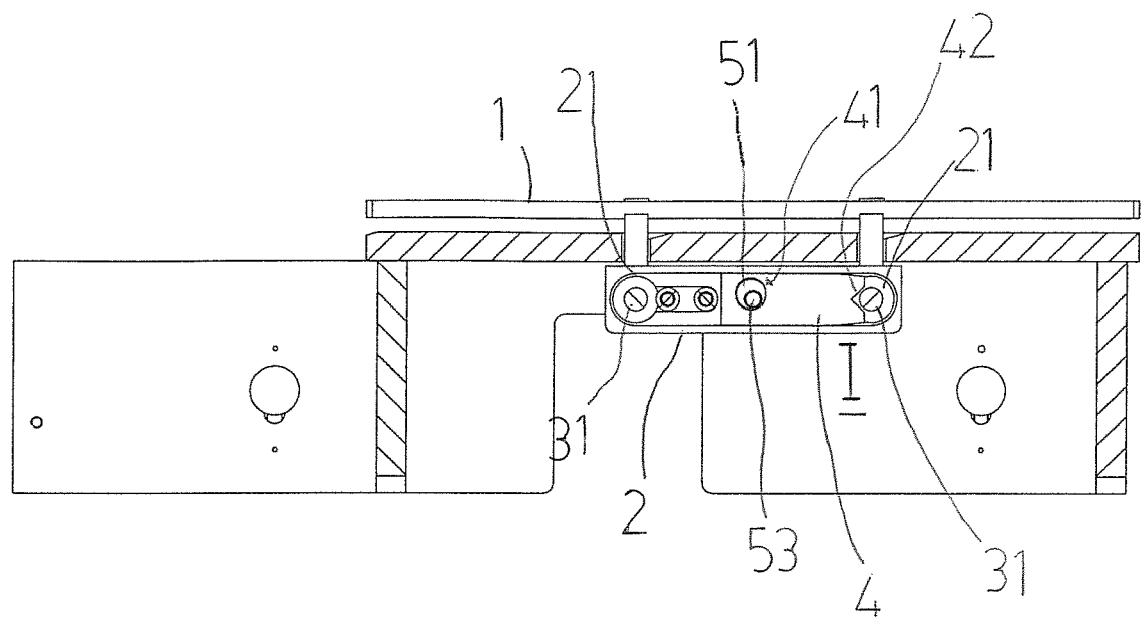
FIG. 5A is the view along section plane V-V of FIG. 4, with some significant elements of the stabilising device represented in a first operative position thereof.
Figure 6A:
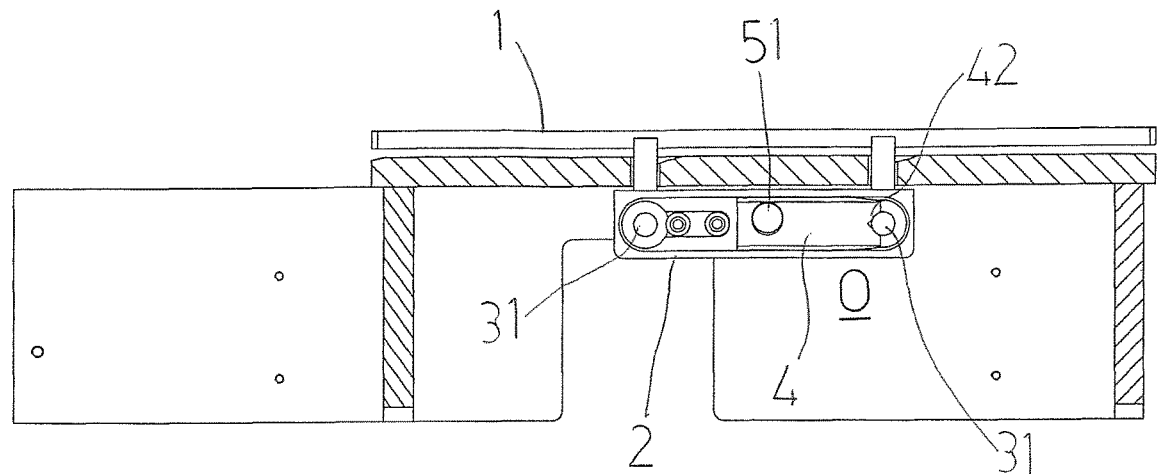
FIG. 6A is the view along section plane V-V of FIG. 4, with the same significant elements of FIG. 5A that are instead represented in a second operative position thereof.

In particular, the activating means (5) are configured and predisposed so as to be activatable for moving the contact element (4) from a non-operative position (I), at which the contact element (4) is distant from the vertical sliding guides (3) (see for example FIG. 5A), to an, operative position (0), at which the contact element (4) is in contact with at least one of the vertical sliding guides (3) so as to provide a friction force resistant to the free sliding of the support element (2) with respect to the vertical sliding guides (3) and therefore provide a braking action to the movement of the abutting bar (1) (see for example FIG. 6A).

In this way, when the articles (A) reaching the grouping zone (Z) are to be pushed and raised upwards, the activating means (5) can be activated for moving and displacing the contact element (4) with respect to the support element (2) from the non-operative position (I) to the operative position (0) in which it is in contact with at least one of the vertical sliding guides (3), so that this reciprocal contact provides a resistant friction force to a free sliding of the support element (2) with respect to the vertical sliding guides (3).

Consequently, when the articles (A) are pushed and raised upwards, the reciprocal contact between the contact element (4) and the vertical sliding guide (3) generates a braking action to the movement of the abutting bar (1), in particular with respect to the raising of the abutting bar (1), able to oppose the counterblow suffered by the abutting bar (1) from the sharp raising of the articles performed by the pusher member.

Therefore, owing to this particular specification, the abutting bar (1) remains constantly in contact with the upper layer of the articles of the grouping of articles during raising thereof, thus obviating the drawbacks signalled in the devices of known type.

This particular detail is also advantageous when the grouping of articles, once completed, is transferred downstream, freeing the grouping zone (Z) for forming a successive grouping of articles.

In this case too, in fact, the activating means (5) can be activated for moving and displacing the contact element (4) into the operative position (0), so that the reciprocal contact between the contact element (4) and the vertical sliding guide (3) provides a braking action of the free fall (by force of gravity) of the abutting bar (1), slowing down and braking the descent, thus preventing a free and uncontrolled fall of the abutting bar (1) from damaging the articles which in the meantime have reached the grouping zone for forming a new grouping of articles, as occurs in the devices of known type and as evidenced in the foregoing.

Further advantageous characteristics of the stabilising device (D) of the invention are described in the following.

The contact element (4) comprises a through-hole (41) while the activating means (5) of the contact element (4) comprise, according to the preferred but not exclusive embodiment illustrated in the figures: a vertical rod (51), which is predisposed so as to coaxially cross the through-hole (41) and which is pivoted to the relative ends so as to be activatable in rotation according to a rotation axis that is offset with respect to the relative axis and to the centre of the through-hole (41), and rotation activating means (52) for activating the vertical rod (51) in rotation about the offset rotation axis.

In this way, owing to this particular predisposition and configuration, when the vertical rod (51) is activated in rotation, in a rotation direction or another, with respect to the offset rotation, it causes and determines the translation of the contact element (4) with respect to the support element (2) from the relative non-operative position (I) to the relative operative position (0), and vice versa.

The stabilising device (D) further comprises a frame (T) on which the vertical sliding guides (3) are predisposed and mounted, while the vertical rod (51) comprises, at relative ends, pins (53) that are predisposed dealigned from the axis of the vertical rod (51) and which are inserted and pivoted in seatings (54) made in the frame (T) so as to define the offset rotation axis for the vertical rod (51).

Figure 3:
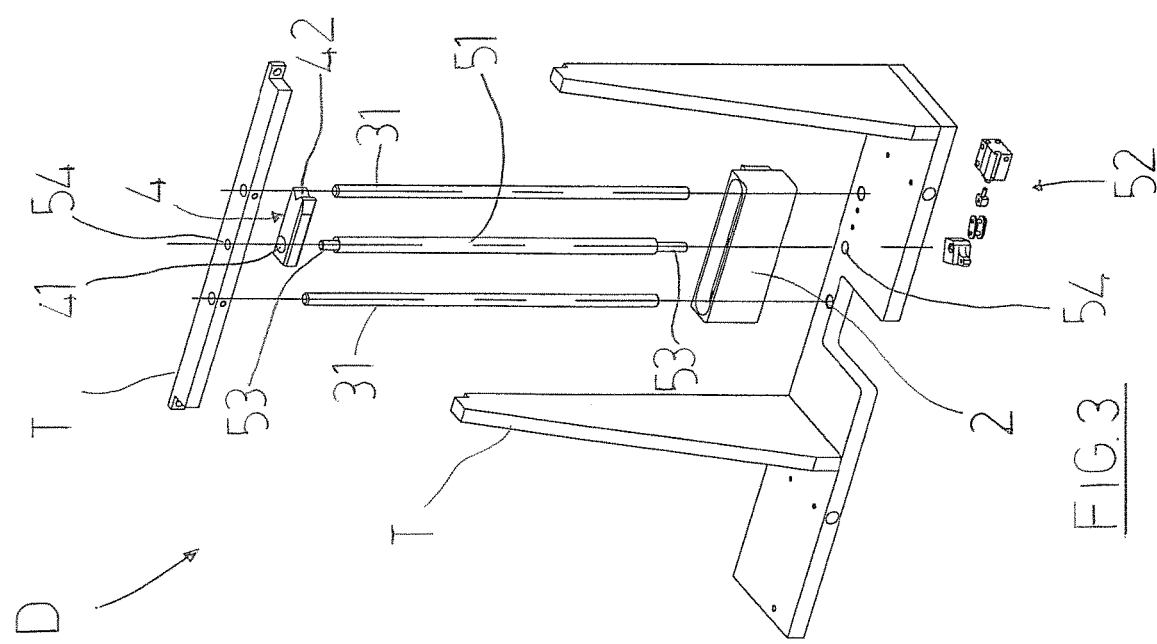
FIG. 3 illustrates, in an exploded perspective view, the main components of the stabilising device of the invention.
Figure 5B:
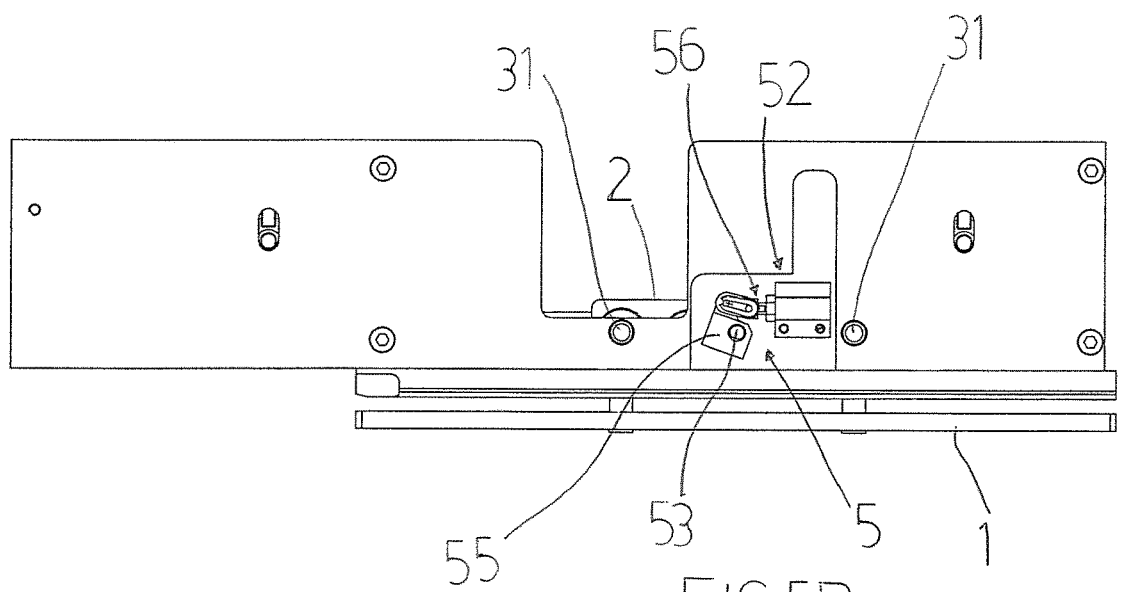
FIG. 5B is a view from below of the stabilising device illustrated in FIG. 4, when the significant elements of FIG. 5A are in the first operative position thereof.
Figure 6B:
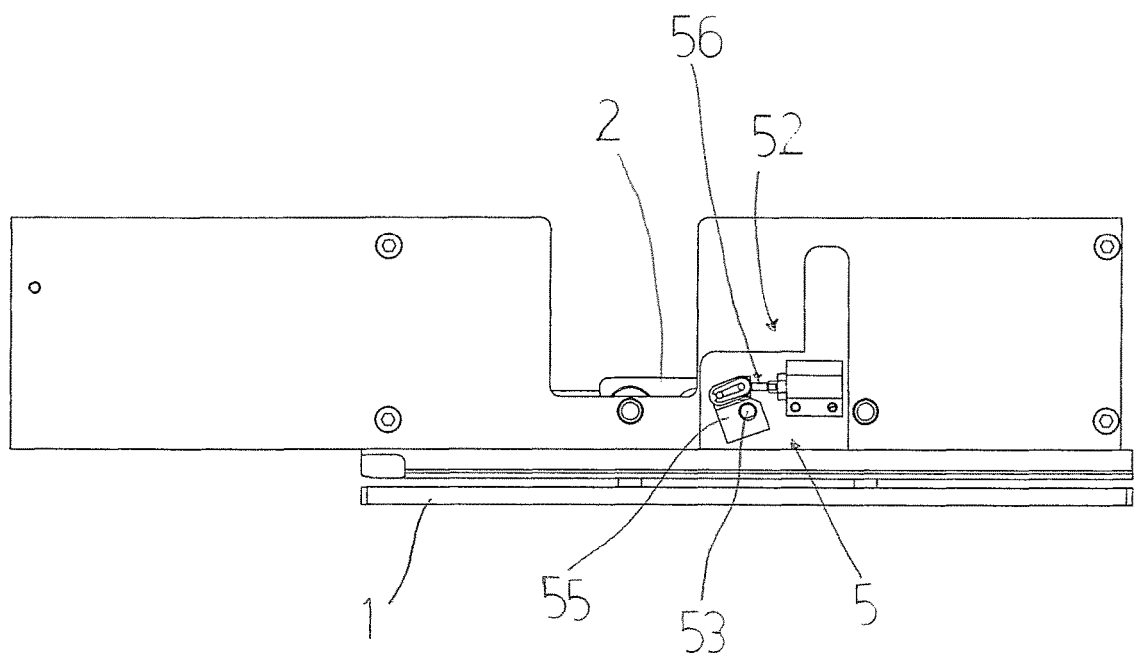
FIG. 6B is a view from below of the stabilising device illustrated in FIG. 4, when the significant elements of FIG. 5A are in the second operative position thereof illustrated in FIG. 6A.

The rotation activating means (52) for activating the vertical rod (51) in rotation comprise a crank element (55) coupled to one of the pins (53) present at the ends of the vertical rod (51) and an actuator organ (56) for moving the crank element (55) so as to activate the rotation of the vertical rod (51) about the offset axis defined by the pins (53) in a rotation direction or another (see for example FIGS. 3, 5B and 6B).

The activating means (5) of the contact element (4) for movement of the contact element (4) from the non-operative position (I) to the operative position (0), and vice versa, can also be realised in a different way to what is described herein, according to technical solutions that are entirely equivalent and easy to predispose by a technical expert in the sector, and therefore in any case falling into the scope of the present invention, as defined in claim 1.

In a preferred aspect, the contact element (4) comprises, at a relative head, a coupling profile (42) profiled in a complementary way to at least one of the vertical sliding guides (3) with which it is destined to go into contact, when it is moved into the relative operative position (0) by the activating means (5), so as to exert a more effective braking action by friction force.

In a further aspect, the support element (2) of the abutting bar (1) comprises a pair of through-slots (21) while the vertical sliding guides (3) comprise a pair of vertical bars (31) which are predisposed so as to freely cross the slots (21) and thus enable free guided vertical sliding of the support element (2) along the vertical bars (31).

From the foregoing it clearly emerges that the stabilising device (D) of the present invention effectively obviates the various drawbacks encountered in the prior art devices.

The invention claimed is:

1. A stabilising device for stabilising articles during raising and grouping thereof, comprising:
   an abutting bar, configured and predisposed for being abutted by the articles which are raised upwards during operations for grouping thereof;
   a support element of the abutting bar;
   vertical sliding guides, the support element being predisposed so as to be coupled to the vertical sliding guides and in order to be able to freely slide along the vertical sliding guides so as to enable displacement upwards of the abutting bar pushed by the articles which are raised upwards during the operations for grouping thereof;
   a contact element, predisposed on the support element so as to be translatable with respect to the support element, activating means of the contact element, configured and predisposed so as to be able to be activatable for moving the contact element from a non-operative position, at which the contact element is distant from the vertical sliding guides, to an operative position, at which the contact element is in contact with at least one of the vertical sliding guides so as to provide a friction force resistant to the free sliding of the support element with respect to the vertical sliding guides and therefore provide a braking action to the movement of the abutting bar, the contact element comprising a through-hole,
   the activating means of the contact element comprising:
   a vertical rod, which is predisposed so as to coaxially cross the through-hole and which is pivoted to the relative ends so as to be activatable in rotation according to a rotation axis that is offset with respect to the relative axis and to the centre of the through-hole, and
   rotation activating means for activating the vertical rod in rotation about the offset rotation axis so that the rotation of the vertical rod in a rotation direction or another with respect to the offset rotation axis determines translation of the contact element with respect to the support element from the relative non-operative position to the relative operative position and vice versa.

2. The stabilising device according to claim 1, further comprising a frame on which the vertical sliding guides are predisposed and mounted and in that the vertical rod comprises, at relative ends, pins predisposed dealigned from the axis of the vertical rod and which are inserted and pivoted in seatings made in the frame so as to define the offset rotation axis for the vertical rod.

3. The stabilising device of claim 2, wherein the rotation activating means for activating the vertical rod in rotation comprise a crank element coupled to one of the pins present at the ends of the vertical rod and an actuator organ for moving the crank element so as to activate the rotation of the vertical rod, about the offset axis defined by the pins, in a rotation direction or another.

4. The stabilising device of claim 1, wherein the contact element comprises, at a relative head, a coupling profile profiled in a complementary way to at least one of the vertical sliding guides with which the contact element is configured to contact, when the contact element is moved into the relative operative position by the activating means, so as to exert a braking action by friction.

5. The stabilising device of claim 1, wherein the support element of the abutting bar comprises a pair of through-slots and in that the vertical sliding guides comprise a pair of vertical bars predisposed so as to freely cross the slots so as to enable free guided vertical sliding of the support element along the vertical bars.

* * * * *